United States Patent [19]

Rouxel et al.

[11] 4,237,201
[45] Dec. 2, 1980

[54] IONIC CONDUCTIVITY MATERIALS, SUITABLE FOR CONSTITUTING SOLID ELECTROLYTES FOR DRY CELLS AND BATTERIES

[75] Inventors: Jean Rouxel; Luc Trichet, both of Nantes, France

[73] Assignee: Agence Nationale de Valorisation de la Recherche, Neuilly sur Seine, France

[21] Appl. No.: 8,724

[22] Filed: Feb. 2, 1979

Related U.S. Application Data

[63] Continuation-in-part of Ser. No. 768,813, Feb. 16, 1977, abandoned.

[30] Foreign Application Priority Data

Feb. 12, 1976 [FR] France ................. 76 04598

[51] Int. Cl.$^2$ .............................................. H01M 6/18
[52] U.S. Cl. .................... 429/104; 429/191; 423/252; 423/263; 423/508; 423/511
[58] Field of Search ........... 429/191, 193, 104, 30; 423/263, 508, 511, 252; 252/62.3 R, 62.3 S, 63, 520, 521

[56] References Cited

U.S. PATENT DOCUMENTS

| 4,009,052 | 2/1977 | Whittingham | 429/193 X |
| 4,009,092 | 2/1977 | Taylor | 429/193 X |
| 4,097,345 | 6/1978 | Shannon | 429/104 X |
| 4,117,103 | 9/1978 | Hong | 429/193 X |
| 4,143,213 | 3/1979 | Jacobson et al. | 429/191 X |

*Primary Examiner*—Anthony Skapars
*Attorney, Agent, or Firm*—Bertram I. Rowland

[57] ABSTRACT

Novel compounds or compositions are provided capable of serving as solid electrolytes involving intercalated dichalcogenides having a combination of a tetravalent metal ion with a metal ion of lower oxidation state and a compensating amount of alkali metal ions to provide a substantially electrically neutral structure. The compositions have the formula:

$$A_x M_x T_{1-x} X_2$$

where A is an alkali metal ion, M is a metal ion of lower valence state than T, T is a metal capable of forming a stable substantially electrically non-conductive intercalatable chalcogenide and X is a chalogen. Also included are batteries employing the subject compositions as the solid electrolyte.

19 Claims, No Drawings

IONIC CONDUCTIVITY MATERIALS, SUITABLE FOR CONSTITUTING SOLID ELECTROLYTES FOR DRY CELLS AND BATTERIES

BACKGROUND OF THE INVENTION

This application is a continuation-in-part of our co-pending patent application Ser. No. 768,813, filed Feb. 16, 1977, now abandoned.

The subject parent application claims priority of French application Ser. No. 76 04598, filed Feb. 19, 1976.

1. Field of the Invention

The invention relates to new compounds or compositions capable of serving as solid electrolytes in dry cell and battery systems. In particular it relates to stable lammelar intercalates characterized by high ionic conductivity.

2. Description of the Prior Art

It has long been known that certain dichalcogenides have lamellar molecular structures and that they can be intercalated by certain counterions, e.g. ammonium, alkali and alkaline earth metals as salts. Also, known is that certain transition metal sulfides, i.e. those of metals from Group VB, can be intercalated to impart superconductive characteristics, such as those taught in U.S. Pat. No. 3,769,210.

Alkali intercalation compounds, i.e. compounds into which elemental alkali atoms have been introduced are known to be excellent ionic conductors, as well as good electronic conductors. See for example, Murphy, et al., *Inorganic Chemistry*, 151,17 (1976). Their electronic conductivity, however, precludes their use as solid electrolytes for cells or batteries since it would be impossible to avoid considerable internal "discharge" of batteries thus formed, even when open-circuited.

β-Alumina is known as a useful solid electrolyte, particularly in an alkali metal, e.g. Na, sulfur battery system. In such systems, the solid electroltye is associated with a cathode consisting of an alkali metal and an anode formed of sulfur and alkali polysulfides. Such batteries are capable of supplying electric current when their temperature is such that the electrodes are molten. A problem encountered with the use of these alkali-sulfur battery systems is that contamination of the oxygen containing solid electrolyte e.g. β-alumina, by the sulfur causes lowered performance and such contamination is difficult to avoid with the use of oxygenated electrolytes.

It is therefore desirable to produce oxygen free solid electrolyte materials, capable of being advantageously utilized in dry batteries and cells, particularly alkali metal-sulfur type systems, which will not be subject to contamination by sulfur.

SUMMARY OF THE INVENTION

It has now been found that when metal chalcogenides are intercalated with a mixture, normally equiatomic, of alkali and other metal ions as a mixed dichalcogenide, particularly ions of metals in Groups IIIA, IIIB, VA, VB and VIB of the Periodic Table of the Elements, the resulting oxygen free compositions are capable of serving as solid electrolytes without the inherent disadvantages associated with known oxygen containing materials presently used, i.e. β-alumina. Particularly useful are the metals of groups IIIA, IIIB, VA, VB, and VIB, which have a valence state lower than that of the metal of the metal chalcogenide being intercalated, particularly a trivalent valence state used in combination with an alkali metal ion.

DETAILED DESCRIPTION

Novel compounds or compositions of the present invention are typically of the formula:

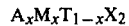

wherein
X is between 0 and 1, typically between from about 0.2 to about 0.8, preferably from 0.35 to 0.8 more preferably about 0.4 to 0.6, and with certain mixed chalcogenides, particularly preferred 0.5;

A is alkali metal ion, i.e. sodium, lithium, potassium, rubidium or cesium, preferably sodium and lithium because of their greater mobility;

M is a metal ion from Group IIIA, IIIB, VA, VB or VIB of the Periodic Table of elements, typically with an atomic number of at least 24, usualy having a +3 valence state, such as indium, thallium, scandium, yttrium, lanthium, antimony, bismuth, tantalum or chromium, preferably, yttrium, indium, bismuth, antimony tantalum and chromium;

T is a metal of Group IVA and IVB or thorium, preferably zirconium, hafnium, thorium and tin, capable of forming a stable, substantially non-electrically conducting, i.e. non-conductive or semiconductive, intercalatable chalcogenide and X is a chalcogen, typically having an atomic number of 16 to 52, i.e. sulfur, selenium and telluruim, preferably 16 to 34.

Of particular interest as metal dichalcogenides $TX_2$ are metals having a sufficient energy gap between the bond band and conduction band to minimize electronic conductivity. The introduction of the tervalent metal into the dichalcogenide structure does not change the electronic properties of the dichalcogenide, but is able to suppress the electronic conductivity of the intercalated alkali metal ion.

The alkali metal ions occupy interstitial sites previously free in the dichalcogenide structure. The structure will normally be of thin sheets (lamellar chalcogenides) or fibers (pseudounidimensional chalcogenides).

The optimum value for X is respect of ionic mobility may be determined empirically for each combination of elements. For combinations having indium and zirconium chalcogenides, the optimum values for X are in the range of about 0.5±0.3, preferably ±0.1. Particularly preferred compositions are compounds employing sodium or lithium in combination with zirconium disulfide $A_xM_xZr_{(1-x)}S_2$ where A is lithium or sodium and X is in the range of 0.3 to 0.8, particularly 0.35 to 0.8, and more preferred 0.4 to 0.6, particularly 0.5.

Compositions of the present invention are characterized by high ionic conductivity, and low electrical conductivity and are particularly useful as solid electrolytes.

Typically, they will have ionic conduction properties similar to β-alumina as evidenced by similar activation energies, i.e. of the same order of magnitude. The activation energy of β-alumina is 0.164 ev, and the activation energies of the compounds or compositions of the present invention will be approximately the same order of magnitude, more specifically in the range of from about 0.15 to about 0.8 ev. The activation energy relates to the energy required for diffusion of the alkali metal ion in the chalcogenide and can be determined by known ways, such as complex impedance or nuclear magnetic resonance.

Compositions of the present invention are typically produced by reacting stoichiometrically appropriate quantities of various chalcogenides according to the following formulas:

$$xAMS_2 + (1-x)TS_2 \rightarrow A_xM_xT_{1-x}S_2 \quad (I)$$

$$(x/2)A_2S + (x/2)M_2S_3 + (1-x)TS_2 \rightarrow A_xM_xT_{1-x}S_2 \quad (II)$$

Such methods are easily and inexpensively carried out. Typical of a method of manufacture according to reaction I is:

$$xNaYS_2 + (1-x)ZrS_2 \rightarrow Na_xY_xZr_{(1-x)}S_2,$$

and according to Reaction II is:

$$(x/2)Na_2S + (x/2)In_2S_3 + (1-x)ZrS_2 \rightarrow Na_xIn_xZr_{1-x}S_2$$

The compounds obtained are in general colored, contrary to the corresponding elemental alkali intercalation compounds which are black.

The subject invention also provides a method of preparation which comprises combining in appropriate proportions the intercalatable metal dichalcogenide ($TX_2$) with a mixed dichalcogenide ($AMX_2$), where the chalcogen of the chalcogenides may be the same or different, and heating the mixture in an inert (oxygen and moisture free) environment, e.g. in vacuo or under $N_2$, generally at temperatures in the range of about 800° to 900° C. The reaction will normally be continued to completion, generally a matter of days.

The invention also relates to dry batteries and cells which are characterised in that their solid electrolyte is comprised of the new compounds or compositions provided herein. Normally, the electrolytes are comprised of a compound wherein A, the alkali ions present in this new composition are the same as the metal principally contained in the anode of the battery system, A°. More specifically, dry batteries and cells are preferred which can be designated conventionally by the following formulations:

$$(S)/A_xM_xT_{1-x}S_2/A°$$

in which symbol (S) refers to the sulfur electrode, which also includes the liquifiable sulfurate electrolytes, e.g. polysulfides, A, A°, M, T and x having the meanings already indicated above.

Particularly preferred embodiments are dry batteries or cells which can be represented by the following formulations:

$$(S)/Na_xIn_xZr_{1-x}S_2/Na$$

$$(S)/Li_xIn_xZr_{1-x}S_2/Li$$

Other characteristics of the invention will become evident from the description of several examples which are provided by way of illustration and not by way of limitation.

EXAMPLE 1

Preparation of the composition of the formula:

$$Na_{0.50}In_{0.50}Zr_{0.50}S_2$$

Indium sulfide, $In_2S_3$ (0.6134 g), sodium sulfide (2.5608 g) and zirconium sulfide $ZrS_2$ (2.4414 g) are introduced into a silicon flask which is then sealed under vacuum. The flask is heated to a temperature of 900° C. which is maintained for 6 days. After opening the flask a product of a yellow brown color is recovered of formula $Na_{0.50}In_{0.50}Zr_{0.50}S_2$. It is stable in air and has an ionic conductivity of the same order of magnitude as that of β-alumina, i.e. 0.28 ev.

EXAMPLE 2

Preparation of the composition of formula:

$$Li_{0.40}Y_{0.40}Zr_{0.60}S_2$$

A mixed sulfide of lithium and indium $LiYS_2$ (1.3012 g) and zirconium sulfide $ZrS_2$ (1.6306 g) are introduced into a silicon flask which is then sealed under vacuum. The flask is heated to a temperature of 950° C. which is maintained for 6 days. After opening the flask a product of a yellow brown color was recovered of formula $Li_{0.40}Y_{0.40}Zr_{0.60}S_2$. It was stable in air and presented an ionic conductivity of the same order of magnitude as that of β-alumina.

The subject compounds should be prepared in a controlled atmosphere chamber to avoid reaction with water.

EXAMPLE 3

Following the general procedure set forth in Examples 1 and 2, the following compounds were prepared:

| Composition | Energy of activation (electron volts) |
|---|---|
| $Na_{0.5}In_{0.5}Sn_{0.5}S_2$ | 0.28 |
| $Na_{0.8}In_{0.8}Sn_{0.2}S_2$ | 0.56 |
| $Na_{0.35}In_{0.35}Zr_{0.65}S_2$ | 0.27 |
| $Na_{0.8}In_{0.8}Zr_{0.2}S_2$ | 0.33 |
| $Na_{0.5}Y_{0.5}Zr_{0.5}S_2$ | 0.41 |
| $Li_{0.5}Y_{0.5}Zr_{0.5}S_2$ | 0.60 |

The subject invention provides novel dichalcogenides which have good ionic conductivity, low or no electrical conductivity, and are not subject to degradation or modification by the electrode material of alkali metal-sulfur batteries, particularly reaction with sulfur or polysulfides. The compositions can be fabricated to provide solid electrolytes for liquid electrodes involving alkali metals, and the alkali metal ion of the solid electrolyte can be chosen in conformance with the alkali metal cathode of the battery. The subject compositions are easily prepared to provide air stable, inert compositions whose properties may be widely varied in accordance with the desired use.

What is claimed is:

1. A composition having high ionic conductivity and minimal electronic conductivity comprising a stable, intercalatable chalcogenide having a wide energy gap between the bond band and the conduction band and having intercalated therein an equiatomic amount of an alkali metal ion and a metal ion having a valence state of one less than that of the metal of said chalcogenide.

2. Composition according to claim 1 of the formula:

$$A_xM_xT_{1-x}X_2.$$

wherein
  x is greater than 0 but less than 1;
  A is an alkali metal ion;
  M is a metal ion in group IIIA, IIIB, VA, VB or VIB of the Periodic Table of Elements having a valence state less than that of T by at least one;
  T is a metal in group IVA, IVB or thorium capable of forming a stable, intercalatable and substantially non-conducting chalcogenide; and
  X is chalcogen.

3. Composition of claim 2, wherein x is from 0.2 to 0.8, and M has an atomic number of at least 24.

4. Composition according to claim 3, wherein A is selected from the group of sodium and lithium, T is selected from the group of zirconium, hafnium, thorium and tin and X is selected from the group of sulfur, selenium and tellurium.

5. Composition according to claim 4, wherein X is of from about 0.4 to about 0.6.

6. Composition of the formula:

$$A_xM_xT_{1-x}X_2$$

wherein
  x is 0.2 to 0.8;
  A is Li or Na;
  M is Y, In, Bi, Sb, Cr or Ta;
  T is Zr, Hf, Th or Sn; and
  X is S, Se or Te.

7. Composition according to claim 6, wherein X is 0.5.

8. Composition according to claim 6, wherein x is 0.4 to 0.6.

9. Composition according to claim 6, wherein x is 0.35 to 0.8.

10. Composition according to claim 6, wherein T is Zr.

11. Composition according to claim 6, wherein T is Sn.

12. Composition according to any of claims 10 and 11, wherein X is S.

13. $A_{0.35-0.8}In_{0.35-0.8}Zr_{0.2-0.65}S_2$ wherein A is Li or Na.

14. $A_{0.35-0.8}Y_{0.35-0.8}Zr_{0.2-0.65}S_2$ wherein A is li or Na.

15. $A_{0.35-0.8}In_{0.35-0.8}Sn_{0.2-0.65}S_2$ wherein A is li or Na.

16. A method for preparing a composition according to claim 1 comprising:
  combining said intercalatable chalcogenide with, in combination in equiatomic amount an alkali metal chalcogenide and a metal chalcogenide, wherein the valence of said metal is one less than the metal of said intercalatable chalcogenide, in an inert atmosphere at a temperature in the range of about 800° to 900° C. for a time sufficient to produce said composition.

17. A method according to claim 16, wherein, said composition is of the formula:

$$A_xM_xT_{1-x}X_2$$

wherein A is Na, Li, K, Rb or Cs, M is a metal from groups IIIA and IIIB, VA, VB or VIB, T is a metal from groups IVA or IVB and A is said alkali metal ion and M is said metal ion of one less than said metal T of said intercalatable chalcogenide.

18. A solid electrolyte for dry batteries or cells having as an electrolyte a composition according to any of claims 1 to 6.

19. A dry battery or cell having alkali metal and sulfur as electrodes and a solid electrolyte according to claim 18.

* * * * *